02-29-72 XR 3,646,266

SR

United States Patent

Hassell

[15] 3,646,266

[45] Feb. 29, 1972

[54] TELEVISION ACTIVATED LIGHT DISPLAY

[72] Inventor: Jon M. Hassell, New York, N.Y.

[73] Assignee: Lightyears, Inc., New York, N.Y.

[22] Filed: June 8, 1970

[21] Appl. No.: 44,156

[52] U.S. Cl. ....................178/7.85, 178/7.86, 350/317

[51] Int. Cl. ....................H04n 9/100

[58] Field of Search ................178/7.85, 7.86; 313/111, 112, 313/161; 350/236, 237, 259, 101, 105, 106, 317; 84/1.16, DIG. 6; 240/41.3, 106.1, 3.1, 10

[56] References Cited

UNITED STATES PATENTS

| | | | |
|---|---|---|---|
| 3,012,461 | 12/1961 | McCall | 350/317 |
| 3,353,897 | 11/1967 | Lemelson | 350/106 |

*Primary Examiner*—Robert L. Griffin
*Assistant Examiner*—Barry Leibowitz
*Attorney*—Peter L. Tailer

[57] ABSTRACT

A closely spaced array of forward projecting convex lens elements larger than three-eighths inch in diameter are mounted in an opaque screen which is placed over the picture tube of a television so that the lens elements provide a nonobjective light display.

7 Claims, 3 Drawing Figures

INVENTOR:
JON M. HASSELL
BY Peter L. Tailer
ATTORNEY

TELEVISION ACTIVATED LIGHT DISPLAY

BACKGROUND OF THE INVENTION

The owner of a television set, when not attending to regular programs as when entertaining, is faced with the grey blind eye of a turned-off set or the disturbing images of a program without volume. No television attachment or accessory has as yet been provided which converts a prosaic home television set into a fascinating and soothing op art light show conductive to meditation, the appreciation of music, or other reflective consciousness expanding pastimes. This invention provides such a television accessory.

DESCRIPTION OF THE PREFERRED EMBODIMENT

Figure 1:
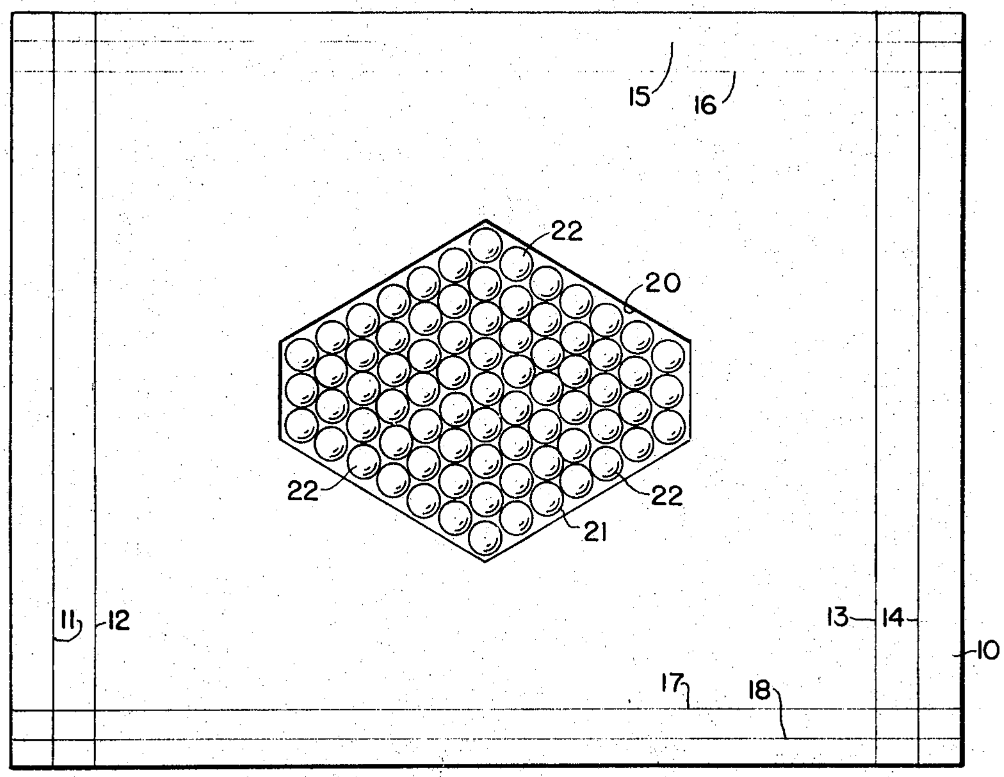
FIG. 1 is a front view of the screen of this invention.
Figure 2:
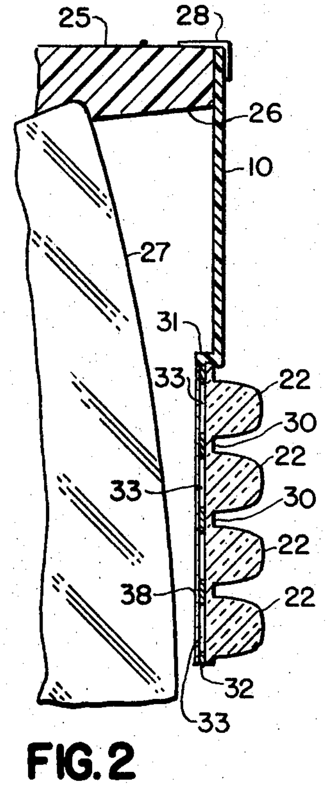
FIG. 2 is a vertical, longitudinal section through a broken-away fragment of the front of a television set with the screen of this invention fixed thereover.
Figure 3:
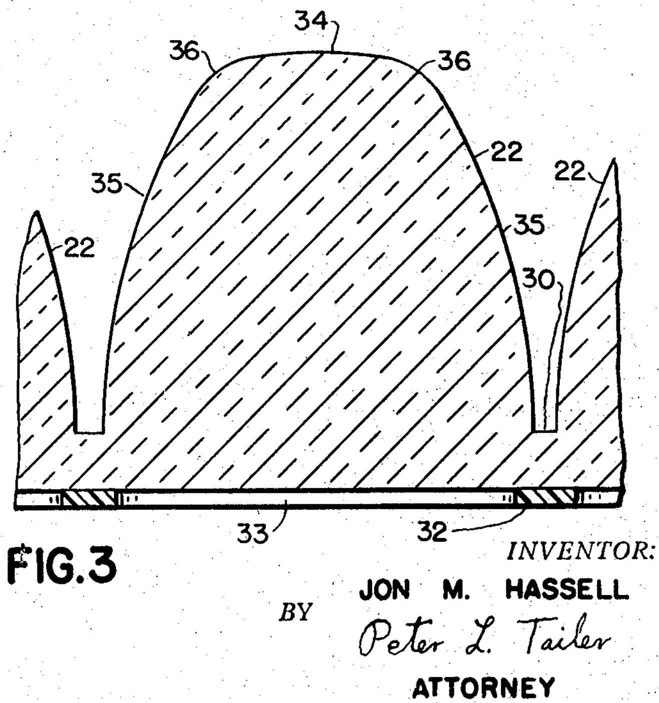
FIG. 3 is an enlarged section through a lens element and fragments of adjacent lens elements of the screen of this invention.

As shown in FIGS. 1, 2 and 3, an opaque screen 10, preferably of a thin brittle plastic, is rectangular in shape and of a size to fit over the front of most home television picture tubes. To fit over every common home television set, vertical score lines 11–14 and horizontal scores lines 15–18 are provided. Any desired number and spacing of score lines 11–18 may be provided so screen 10 may be made into a desired size to closely fit over the picture tubes of most television sets by breaking away portions of screen 10. A central opening 20 in screen 10 has the array 21 of lens elements 22 disposed within it.

As shown in FIG. 2, a television set 25 has a bezel 26 containing picture tube 27. Short lengths of tape 28 or the like secure screen 10 over the bezel 26 and picture tube 27. Lens elements 22 of transparent plastic project from a flat base 30 with which they are integrally molded or cast. As shown, base 30 snaps in a groove in an inward turned lip 31; however, the flat base 30 may be fixed behind screen 10 in any desired manner such as gluing, etc. An opaque sheet 32 containing the light-passing holes or portions 33 is fixed behind 30 with each hole or light-passing portion 33 being disposed behind a lens element 22. The diameters of the holes 33 should be less than that of the elements 22 so slight errors in the registration of the holes 33 with the lens elements 22 will not be obvious. Sheet 32 may be die cut and laminated to base 30, it may be screened on base 30, it may not hot stamped on base 30, or it may be formed thereon in any other suitable manner.

As may be seen in FIG. 3, each lens element 22 in section has a flattened large radius curved surface 34, long radius sides 35, and short radius transition surfaces 36 therebetween. Each lens element 22 gathers and integrates light from at least a part of the area of the picture tube 27 below it. On a black and white television set 25, each lens element will either glow brightly, remain dark, or light to some intermediate extent. On a color television set 25, each lens element 22 will glow or light with a color of a given intensity or brightness. As images move and change on the television screen 27, the colors and light intensity of each lens element 22 over a changing portion of an image will smoothly change. When a new scene appears on the picture tube 27, as when a distance scene becomes a closeup or a commercial is flashed, the lens elements 22 suddenly blink into a new pattern. The effect, which provides no recognizable images, is fascinating to watch for hours as a pure light show. It is almost as good in black and white as on a color television set 25. If desired, for black and white sets 25, a transparent color screen 38 may be placed behind lens elements 22 as shown in FIG. 2. Screen 38 may have one or more colors.

To obtain the desired nonobjective results with no recognizable images but with a pure light show, the lens elements 22 should be at least three-eighths inch in diameter and no further than one diameter apart. In one preferred embodiments, the lens elements 22 were about 1 inch in diameter spaced one-sixteenths inch apart in an array 21 as shown, rows being at 60° with each other. Elements 22 projected 0.515 inches from the front of base 30 and had front surfaces 34 with a radius of 0.600 inches, side surfaces 35 with a radius of 0.900 inches, and transition surfaces 36 with a radius of 0.300 inches. Element 22 shown in FIG. 3 is not drawn to scale as these proportions may be varied within considerable limits; however, the elements 22 should be convex shapes which integrate light thereunder to glow with an appearance of even intensity in each element 22.

While this invention has been shown and described, it will nevertheless be understood that this is purely exemplary and that modifications may be made without departing from the spirit and scope of the invention. For example, the number and arrangement of lens elements 22 in array 21 may be varied so that the lens elements are disposed in rows and columns.

What is claimed is:

1. A light display for use with a home television set having a picture tube, said light display comprising, in combination, an opaque screen to be fixed over the picture tube of a television set, and forward projecting light-passing convex lens elements disposed in an array on said screen, said lens elements being at least three-eighths inches in diameter and being closely spaced, said screen containing light-passing areas disposed behind each lens element, said lens elements glowing with light passing therethrough from said picture tube providing a nonobjective light show.

2. The combination according to claim 1 wherein said lens elements are disposed a distance apart less than the diameter of said lens elements.

3. The combination according to claim 2 wherein said screen contains a central opening, and with the addition of a flat base, and a sheet behind said base, said lens elements being integrally formed of transparent material projecting forward from said base, said flat base being fixed in the central opening in said screen, said sheet forming a part of said screen and being fixed behind said base, said sheet containing said light-passing areas behind said lens elements.

4. The combination according to claim 3 wherein said light-passing areas in said sheet are smaller than the diameter of said lens elements.

5. The combination according to claim 2 wherein said lens elements each have a large radius front surface, a large radius side surface, and a smaller radius transition surface therebetween.

6. The combination according to claim 2 wherein said screen is a thin sheet of brittle material containing peripheral score lines.

7. The combination according to claim 3 wherein said television set is black and white and with the addition of a transparent color screen behind said base.

* * * * *